United States Patent [19]
van Montfort

[11] Patent Number: 6,152,528
[45] Date of Patent: Nov. 28, 2000

[54] CHILD'S SEAT

[75] Inventor: Donald Hendrikus van Montfort, Herkenbosch, Netherlands

[73] Assignee: Maxi Miliaan B.V., Netherlands

[21] Appl. No.: 09/230,787

[22] PCT Filed: Aug. 6, 1997

[86] PCT No.: PCT/NL97/00456

§ 371 Date: Sep. 27, 1999

§ 102(e) Date: Sep. 27, 1999

[87] PCT Pub. No.: WO98/06289

PCT Pub. Date: Feb. 19, 1998

[30] Foreign Application Priority Data

Sep. 8, 1996 [NL] Netherlands ............ 1 003 774

[51] Int. Cl.$^7$ ................... A47D 1/10; B60N 2/28
[52] U.S. Cl. ................... 297/250.1; 297/256.13
[58] Field of Search ............ 297/250.1, 256.13, 297/256.16

[56] References Cited

U.S. PATENT DOCUMENTS

| | | |
|---|---|---|
| 1,340,303 | 5/1920 | Sterne . |
| 2,807,067 | 9/1957 | Bayon . |
| 5,458,398 | 10/1995 | Meeker et al. ............ 297/250.1 |
| 5,567,007 | 10/1996 | Czernakowski et al. ........ 297/250.1 |
| 5,611,596 | 3/1997 | Barley et al. ............ 297/256.13 |
| 5,671,971 | 9/1997 | Koyanagi et al. ........... 297/250.1 |
| 5,695,243 | 12/1997 | Anthony et al. ........... 297/250.1 |
| 5,954,397 | 9/1999 | Czernakowski et al. ........ 297/250.1 |
| 5,957,531 | 9/1999 | Kane et al. ............ 297/250.1 X |
| 5,979,982 | 11/1999 | Nakagawa ............ 297/250.1 |

FOREIGN PATENT DOCUMENTS

| | | |
|---|---|---|
| 947110A | 1/1966 | United Kingdom . |
| 2262025A | 6/1993 | United Kingdom . |

*Primary Examiner*—Peter M. Cuomo
*Assistant Examiner*—Rodney B. White
*Attorney, Agent, or Firm*—Patterson, Thuente, Skaar & Christensen, P.A

[57] ABSTRACT

A child's seat (1) comprising a seat portion and a back portion, which child's seat can be secured in a vehicle by means of a three-point seat belt present in the vehicle. The three-point seat belt (21) is connected to the vehicle with a first end (40) and with a second end (41), and can be detachably secured to a belt buckle (43) provided in the vehicle by means of a belt tongue (42) provided between the ends. In the mounted position of the child's seat in the vehicle, the first end of the belt (40) is positioned near the side of the back portion remote from the seat portion, the second end is positioned under the first end, near the seat portion, and the belt tongue (42) connected to the belt buckle (43) is positioned on a side of the seat portion remote from the second end. The child's seat is provided near the side of the back portion remote from the seat portion with at least one clamping device (5) comprising a housing and a tightening device (13) positioned within the housing, by a belt portion extending between the belt tongue (42) and the first end (40) can be tightened in a tightening direction away from the back portion and be locked against movement with respect to the clamping device in a locking direction opposed to the tightening direction. The housing comprises at least two parts (6,8) which are capable of pivoting movement about a pivot pin (7) with respect to each other. The parts (6,8) are capable of releasable interlocking engagement and which are provided on a side remote from the pivot pin with interlocking closing elements (9,12), whereby the parts are capable of pivoting movement with respect to each other from a first position, in which the belt portion extending between the belt tongue (42) and the first end (40) can be positioned between the two parts to a second position in which the belt portion is retained between the parts and the belt portion present in the clamping device is undetachably connected to the clamping device, and vice versa.

4 Claims, 5 Drawing Sheets

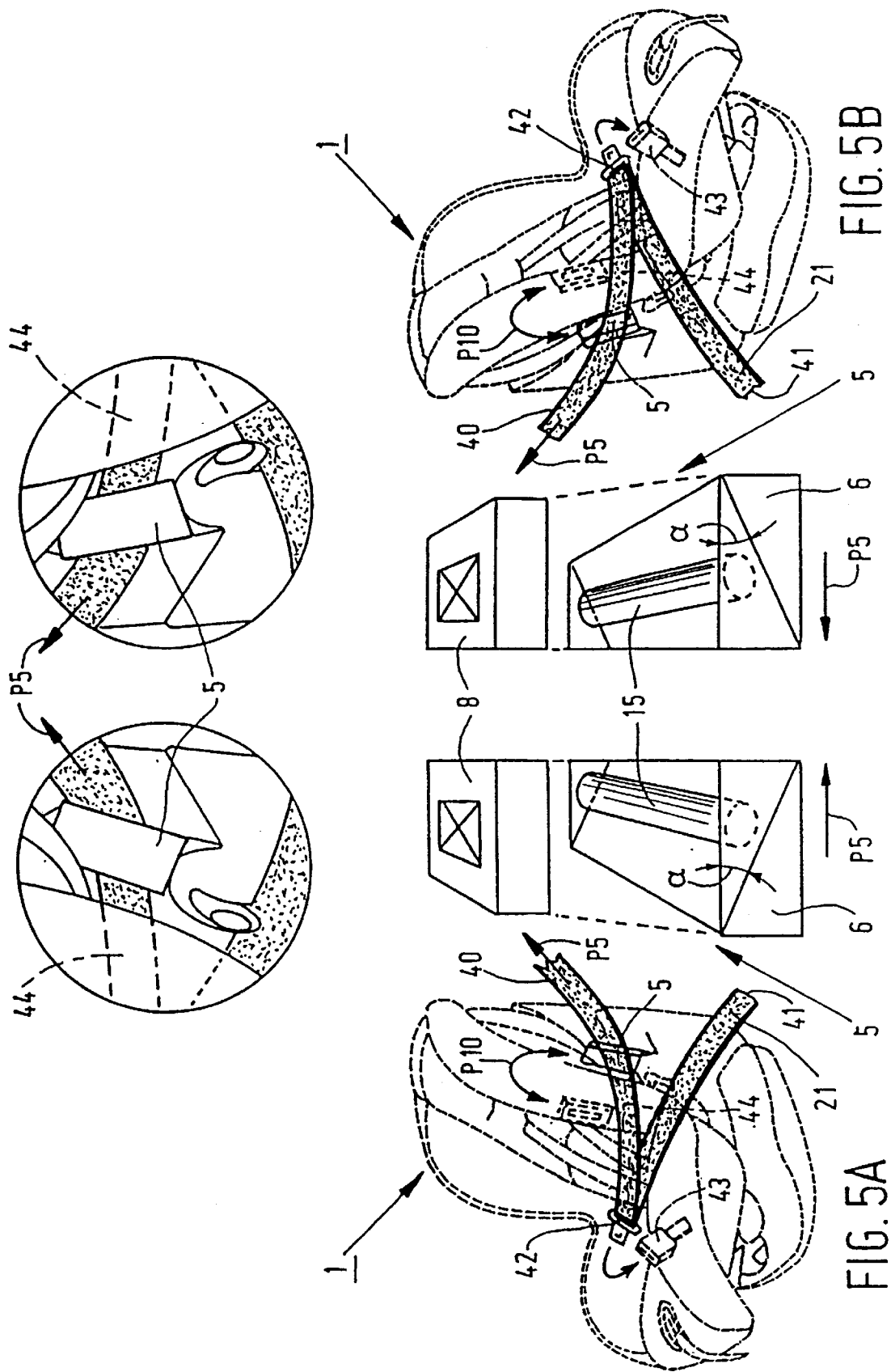

CHILD'S SEAT

The invention relates to a child's seat comprising a seat portion and a back portion, which child's seat can be secured in a vehicle by means of a three-point seat belt present in said vehicle, which three-point seat belt is connected to the vehicle with a first end and with a second end and which can be detachably secured to a belt buckle provided in said vehicle by means of a belt tongue provided between said ends, whereby in the mounted position of the child's seat in the vehicle the first end of the belt is positioned near an upper side of said back portion, the second end is positioned under the first end, near the seat portion, and the belt tongue connected to the belt buckle is positioned on a side of said seat portion remote from said second end, whereby the child's seat near the upper side of the back portion is provided with at least one clamping device comprising a housing and a tightening device positioned within said housing, by means of which a belt portion extending between said belt tongue and said first end can be pulled in a tightening direction away from said back portion and be locked against movement with respect to the clamping device in a locking direction opposed to said tightening direction, said tightening device is provided with a locking pin extending in the transverse direction of the belt, which locking pin can be coupled to the belt, whereby said locking pin is capable of movement in and opposed to the tightening direction, and in a direction away from the belt, transversally thereto.

With a similar child's seat known from British Patent Application GB-A-2,288,202 the child's seat is secured in the car by means of a three-point seat belt present in the car. The belt is thereby connected to a belt buckle present in the car by means of a belt tongue. The three-point belt is connected to the car with both ends and consequently must be introduced into the clamping device in a direction transversely to the longitudinal direction of the belt. The shoulder belt is thereby guided into the clamping device secured to the child's seat, for example, and subsequently tightened in a desired tightening direction.

The belt must be locked against movement in the clamping device in a second locking direction opposed to said first direction, in order to prevent undesirable movement of the child's seat with respect to the belt. The child's seat can be taken out of the car by removing the belt from the buckle and from the clamp.

The clamping device known from British Patent Application GB-A-2,288,202, is provided with a C-shaped part comprising a baseplate and two flanges extending towards each other. A tightening device is located between said baseplate and said flanges. The belt is introduced into the C-shaped part through the flanges, so that the belt will be positioned between the tightening device and the flanges. The belt is capable of movement in a first tightening direction whilst being locked against movement in a second locking direction. When the clamping device is used for securing a child's seat in a car, forces will also be exerted on the belt and on the clamping device in directions transversely to the belt in the event of an accident or a collision.

One drawback of the known device is the fact that when such forces occur, the C-shaped part can bend open relatively easily, as a result of which the belt will move out of the C-shaped part and the child's seat will no longer be connected to the car. This is undesirable, cf course. Another drawback is the fact that the C-shaped part is relatively weak, as a result of which the tightening force exerted on the belt will vary.

Another drawback of the known device is the fact that the locking pin is mounted in a frame which is secured in the housing. Due to the additional frame the clamping device is relatively thick and relatively complicated to manufacture.

The object of the invention is to provide a child's seat when the drawbacks are avoided.

This object is accomplished in the child's seat according to the invention in that the housing comprises a first and a second part which are capable of pivoting movement with respect to each other about a pivot pin extending transversally to said locking pin, which parts are capable of releasable interlocking engagement and which are provided on a side remote from said pivot pin with interlocking closing elements, whereby said parts are capable of pivoting movement with respect to each other from a first position, in which the belt portion extending between said belt tongue and said first end can be positioned between said two parts, to a second position, in which said belt portion is retained between said parts and the belt portion present in said clamping device is undetachably connected to the clamping device, and vice versa, whereby the two ends of said locking pin are slidably journalled in slots provided ir the first part and extending at an angle to the belt, whereby the ends of said slots facing the longitudinal side of said back portion are positioned further away from said second part than the ends of said slots facing the centre of said back portion.

Because the clamping device is capable of being closed, the forces which are allowed to be exerted on the closed clamping device are relatively large. Thus it is ensured that the child's seat is securely connected to the car by means of the clamping device and the belt. The belt can be easily removed from the clamping device by unlocking the clamping device, after which the belt is detached from the belt buckle and the child's seat can be take out of the car.

Due to the presence of the two parts being movable with respect to each other the clamping device can be opened and closed in a relatively simple manner.

Due to the slots in which ends of the locking pin are slidably journalled, the clamping device is relatively compact and easily to manufacture.

The belt can be tightened in a simple manner by means of such a locking pin, whilst at the same time ensuring that the belt is locked in the second direction. Because the second part is laid over the belt after positioning the belt against the first part, and is connected to the first part on a side remote from the pivot pin, a closed construction surrounding the belt in transverse direction is obtained, which construction is relatively strong and rigid.

It is noted that from U.S. Pat. No. 1,340,303 a buckle is known which is connected to one end of a belt and in which another end of said belt is capable of movement in a tightening direction. Such a buckle is not intended nor dimensioned for tightening a child's seat by means of a three-point seat belt provided in a car.

The objective of the invention is also accomplished in a child's seat according to the invention in that the housing comprises a first and a second part which are capable of pivoting movement with respect to each other about a pivot pin extending transversally to said locking pin, which parts are capable of releasable interlocking engagement and which are provided on a side remote from said pivot pin with interlocking closing elements, whereby said parts are capable of pivoting movement with respect to each other from a first position, in which the belt portion extending between said belt tongue and said first end can be positioned between said two parts, to a second position, in which said belt portion is retained between said parts and the belt portion present in said clamping device is undetachably connected to the clamping device, and vice versa, whereby the first part comprises a C-shaped part extending in the transverse direction of the belt, which is provided with two flanges extending toward each other, whereby the belt can be positioned in said C-shaped part through said flanges, whilst the second part is pivoted to said first part by means of said pivot pin extending in a direction parallel to said C-shaped part, capable of being locked to said first part on either side of the belt with a side remote from said pivot pin, whereby said belt surrounds said C-shaped part and said second part in the shape of an S during use.

This results in a clamping device which is comparable with tightening devices which are known per se, for example for tightening rucksack belts. With such known tightening devices it is not possible, however, to introduce the belt into the clamping device in a direction transversely to the longitudinal direction of the belt, which renders the known clamping device unsuitable for being used to secure a child's seat in a car.

One embodiment of the child's seat according to the invention is characterized in that the clamping device is capable of Movement from a first longitudinal side of the back part, which extends transversely to the seat part, to a second longitudinal side of the back part, whereby the clamping part is capable of pivoting movement with respect to the child's seat, in such a manner that the tightening direction is directed away from the child's seat on both longitudinal sides.

In this manner the child's seat only needs to be provided with a single clamping device, which, depending on the desired position of the clamping device with respect to the child's seat, is positioned near either one of the longitudinal sides of the child's seat. Because the clamping device is also pivoted while being moved from one longitudinal side to the other, the tightening direction will remain directed away from the child's seat.

Another embodiment of the child's seat according to the invention is characterized in that the first part comprises a C-shaped part extending in the transverse direction of the belt, which is provided with two flanges extending toward each other, whereby the belt can be positioned in said C-shaped part through said flanges, whilst the second part is pivoted to said first part by means of a pivot pin extending in a direction parallel to said C-shaped part, capable of being locked to said first part on either side of the belt on a side remote from said pivot pin, whereby said belt surrounds said C-shaped part and said second part in the shape of an S during use.

This results in a clamping device which is comparable with tightening devices which are known per se, for example for tightening rucksack belts. With such known tightening devices it is not possible, however, to introduce the belt into the clamping device in a direction transversely to the longitudinal direction of the belt, which renders the known clamping device unsuitable for being used to secure a child's seat in a car.

The invention will be explained in more detail hereafter with reference to a drawing, in which.

FIGS. 5A and 5B each show an embodiment of the child's seat according to the invention comprising a movable and pivotal clamping device, with the clamping device positioned on the right-hand side and on the left-hand side respectively.

Like parts are numbered alike in the Figures.

Figure 1:
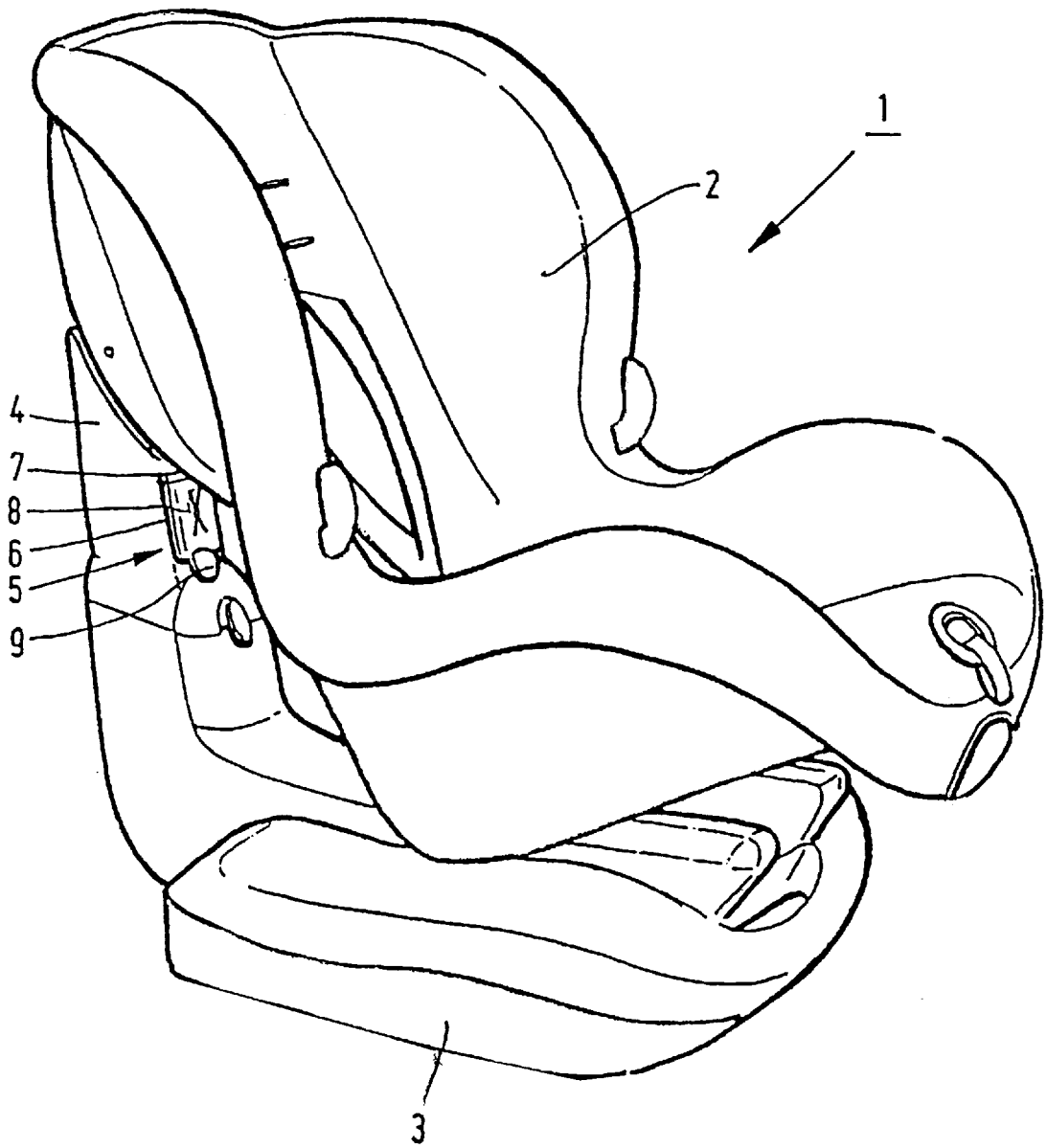
FIG. 1 shows a child's seat according to the invention, which is provided with a clamping device.

FIG. 1 shows a child's car seat 1 comprising a seat bucket 2 and a support 3 supporting said seat bucket 2. When child's seat 1 is being placed in a car (not shown), a three-point seat belt, which is known per se, is passed between seat bucket 2 and support 3 and subsequently connected to a belt buckle present in the car. The child's seat is provided on a back part 4 of support 3 with two clamping devices 5 positioned on either side of back part 4. The shoulder belt of the car is passed through one of the clamping devices 5, as will be explained in more detail hereafter.

Figure 2:
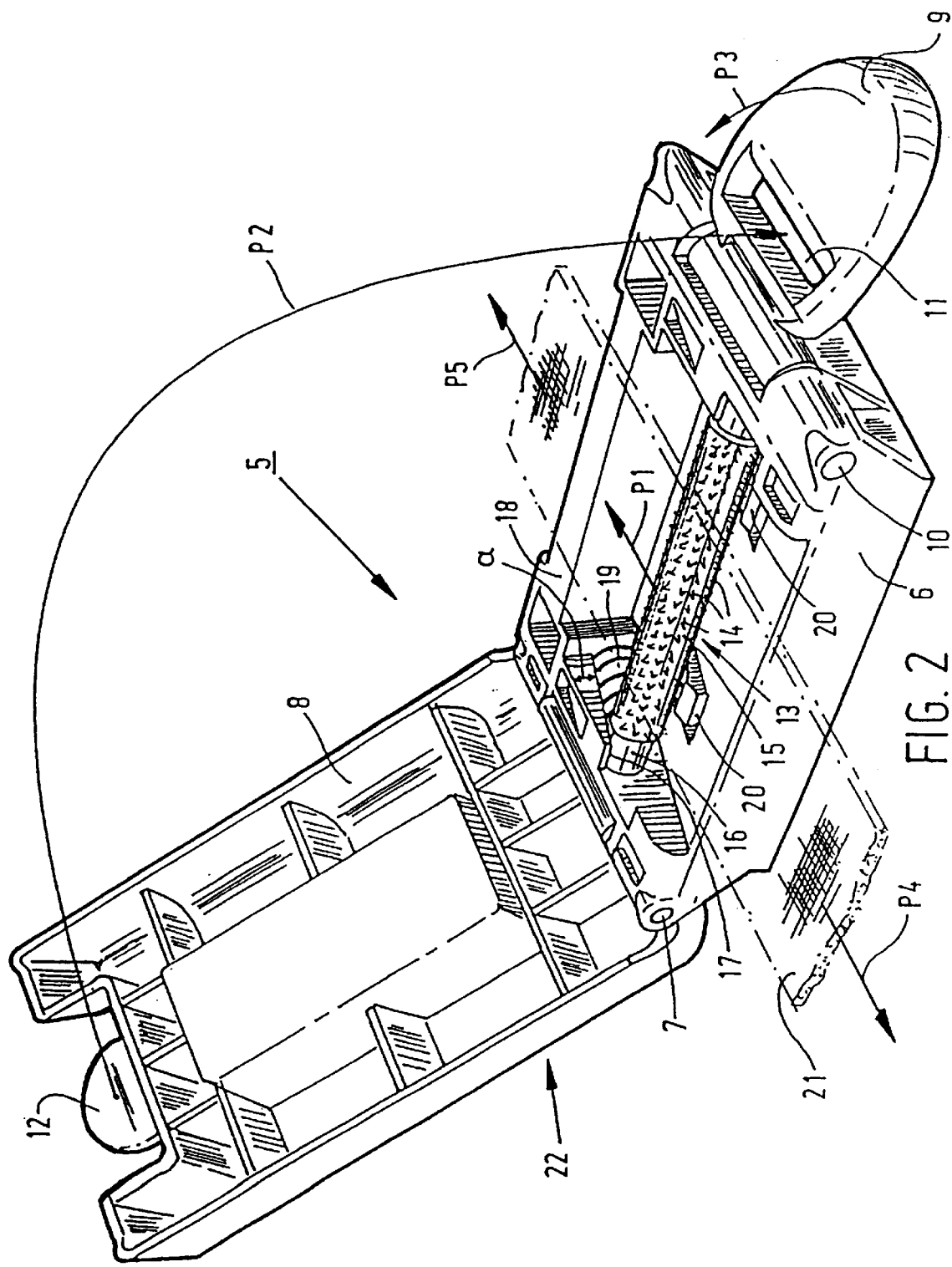
FIG. 2 is a perspective view of a first embodiment of a clamping device according to the invention.

FIG. 2 shows a second embodiment of a clamping device 5 of a child's seat according to the invention, which comprises a first part 6 and a second part 8, which is pivoted to said first part by means of a pivot pin 7. First part 6 is provided with a locking lip 9 on a side remote from pivot pin 7, which locking lip is capable of pivoting movement about a pivot pin 10 extending parallel to pivot pin 7. Locking lip 9 is provided with a recess 11. Second part 8 is provided with a tongue 12 on a side remote from pivot pin 7. The first part is provided with a tightening device 13, which comprises a locking pin 15 provided with teeth 14, which is journalled with two circular ends 16 in two parallel slots 17.

Slots 17 include an obtuse angle α with a belt supporting plate 18 of first part 6. Locking pin 15 is moved against the spring force of springs 19 positioned within slots 17, in a direction indicated by arrow P1. Movement of locking pin 15 in a direction opposed to arrow P1 is limited by two lips 20. The operation of clamping device 5 is as follows. In a position shown in FIG. 2 shoulder belt 21 is placed against belt supporting plate 18, after which second part 8 is pivoted in a direction indicated by arrow P2 and positioned parallel to first part 6. Then lip 9 is pivoted in a direction indicated by arrow P3, whereby recess 11 encloses tongue 12 and belt 21 is retained by the housing made up of first part 6, second part 8 and lip 9. Belt 21 thereby abuts against locking pin 15, with teeth 14 engaging belt 21. When a force is exerted on belt 21 in the direction indicated by arrow P4, locking pin 15 will be moved in a direction away from arrow P1, whereby teeth 14 of locking pin 15 will be pressed further into the belt, preventing belt 21 from moving in the direction indicated by arrow P4. When a force is exerted on belt 21 in the direction indicated by arrow P5, locking pin 15 will be moved in a direction indicated by arrow P1 against the spring force of springs 19, as a result of which teeth 14 will be detached from belt 21 and belt 21 will be moved in the direction indicated by arrow P5. After the force being exerted in the direction indicated by arrow P5 has been released, locking pin 15 will be pressed against belt 21 again by springs 19.

It is noted that in the embodiment shown in FIG. 1 first part 6 is connected to support 3. It will be apparent that it is also possible to connect second part 8 to support 3.

Figure 3:
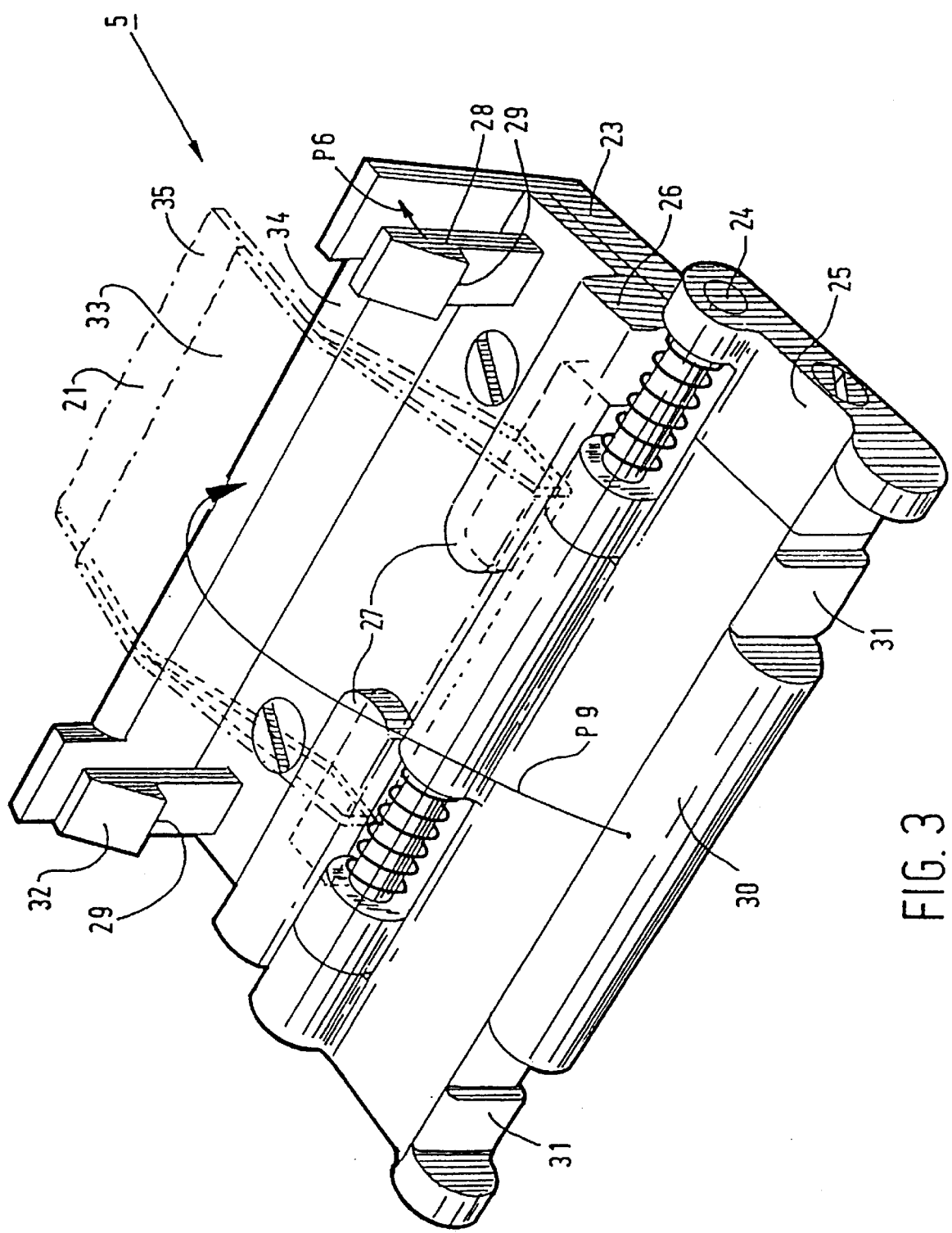
FIG. 3 is a perspective view of a second clamping device according to the invention, in an open position thereof.

FIG. 3 shows a second embodiment of a clamping device 5 of a child's seat according to the invention, which comprises a first part 23 and a second part 25, which is pivoted to said first part by means of pivot pin 24. First part 23 comprises a C-shaped part 26, which is provided with two flanges 27 directed towards each other. First part 23 is provided on a side remote from pivot pin 24 with two hook-shaped elements 28, which are provided with stop surfaces 29 on a side facing pivot pin 24. Second part 25 is provided on a side remote from pivot pin 24 with a roller beam 30 extending parallel to pivot pin 24, and two stop blocks 31 positioned on either side of roller beam 30.

The operation of clamping device 5 is as follows.

Figure 4:
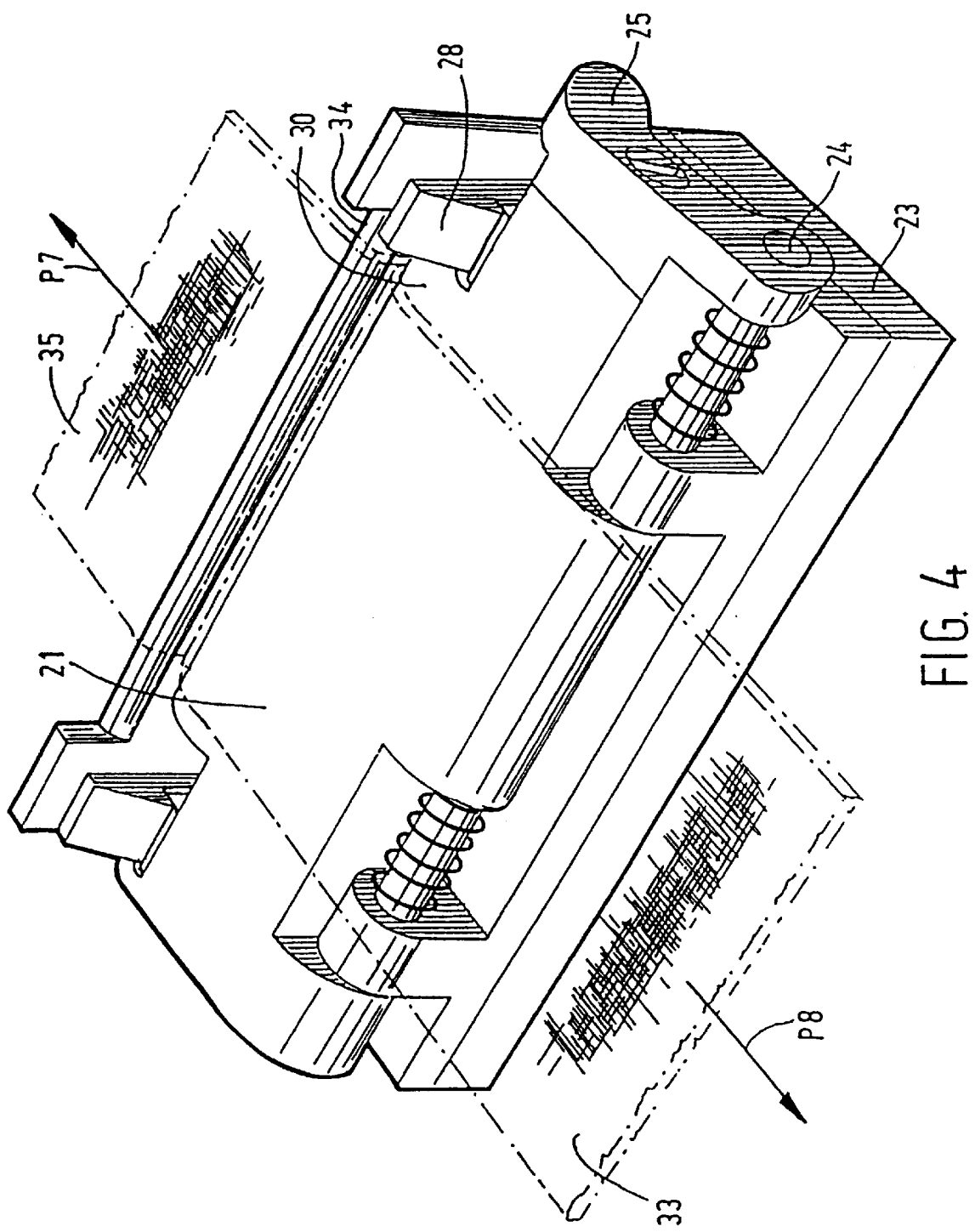
FIG. 4 shows the clamping device shown in FIG. 3, in a closed position thereof.

In the position shown in FIG. 3 belt 21 is introduced into C-shaped part 26 through flanges 27, after which belt 21 extends about flanges 27. Then second part 25 is pivoted about pivot pin 24 in a direction indicated by arrow P9. Stop blocks 31 come into engagement with sloping surfaces 32 of elements 28 thereby, as a result of which elements 28 will be pivoted in a direction indicated by arrow P6. Elements 28 are made of a bendable material for this purpose. Second part 25 is moved into the direction indicated by arrow P9 until stop blocks 31 abut against stop surfaces 29. The spring force of the material has thereby caused elements 28 to move in a direction opposed to the direction indicated by arrow P6, back to their original position. The moment the stop blocks 31 abut against the stop surfaces 29 a housing made up of first element 23 and second element 25 will be closed. Then the left-hand part 33, seen in FIG. 3, of belt 21 will be laid over roller beam 30 of second part 25, as is shown in FIG. 4. First part 23 is provided with an upright edge 34 extending parallel to pivot pin 24, over which the right-hand part 35 of belt 21 extends.

In the closed position of clamping device 5 shown in FIG. 4 belt 21 extends in the shape of an S in the housing made up of said first and said second part. If a force is exerted on part 35 of belt 21 in a direction indicated by arrow P7, no movement of belt 21 will take place in that direction. If a force is exerted on belt 21 in a direction P8 opposed to the direction indicated by arrow P7, there will be a movement of belt 21 in the direction indicated by arrow P8. The reason why movement in the direction indicated by arrow P8 is possible, whereas movement of belt 21 in the direction indicated by arrow P7 is not possible, is to be found in the presence of belt parts 33, 35, which are passed over flanges 27 and which abut against each other between roller beam 30 and upright edge 34. The operation of the tightening device made up of first part 23 and second part 25 corresponds with that of tightening devices as they are inter alia known from the tightening of rucksack belts, and consequently will not be discussed in more detail herein.

FIGS. 5A and 5B show a child's seat and details of said child's seat respectively, comprising a clamping device positioned on the right-hand side and one on the left-hand side respectively.

With the child's seat 1 shown in FIG. 5A clamping device 5 is positioned near the right-hand longitudinal side of child's seat 1. Belt 21 is connected to the vehicle with a first end 40 and a second end 41. Belt 21 is furthermore provided with a belt tongue 42 present between said first and said second end 40, 41, which belt tongue can be detachably connected to a belt buckle 43 provided in the vehicle. Child's seat 1 is provided with a clamping device 5 shown in FIG. 2, which is present near the right-hand longitudinal side of child's seat 1. Clamping device 5 can be moved and simultaneously be pivoted in the direction indicated by arrow P10 towards the left-hand side of child's seat 1.

In the mounted position of child's seat 1 in the vehicle a belt portion 44 present between belt tongue 42 and first end 40 extends through clamping device 5. Belt portion 44 can be tightened in the tightening direction indicated by arrow P5, away from child's seat 1, whilst belt portion 44 is locked against movement in a direction opposed to direction P5.

If child's seat 1 is mounted at another location in the vehicle, whereby first end 40 and second end 41 are positioned on the left-hand side of the child's seat, clamping device 5 will be moved and pivoted in the direction indicated by arrow P10, so that clamping device 5 will likewise be positioned near the left-hand side of child's seat 1, as shown in FIG. 5B. Following that the child's seat can be secured in the vehicle by means of belt 21. In this manner the child's seat only needs to be provided with a single clamping device.

In the clamping device shown in FIG. 2 pivot pin 7 Extends parallel to the longitudinal direction of belt 21, whilst in the clamping device shown in FIGS. 3 and 4 pivot pin 24 extends transversely to the longitudinal direction of belt 21. With both clamping devices the belt is retained in the housing formed by the two parts after the two parts have been pivoted in opposite directions and have subsequently been locked in position.

What is claimed is:

1. A child's seat comprising a seat portion and a back portion, which child's seat can be secured in a vehicle by means of a three-point seat belt present in said vehicle, which three-point seat belt is connected to the vehicle with a first end and with a second end and which can be detachably secured to a belt buckle provided in said vehicle by means of a belt tongue provided between said ends, whereby in the mounted position of the child's seat in the vehicle, the first end of the belt is positioned near an upper side of said back portion, the second end is positioned under the first end, near the seat portion, and the belt tongue connected to the belt buckle is positioned on a side of said seat portion remote from said second end, whereby the child's seat near the upper side of the back portion is provided with at least one clamping device comprising a housing and a tightening device positioned within said housing, by means of which a belt portion extending between said belt tongue and said first end can be pulled in a tightening direction away from said back portion and be locked against movement with respect to the clamping device in a locking direction opposed to said tightening direction, said tightening device is provided with a locking pin oriented transversely to the belt, which locking pin can be coupled to the belt, whereby said locking pin is capable of movement in and opposed to the tightening direction, and in a direction away from the belt, transversely thereto, characterized in that the housing comprises a first and a second part which are capable of pivoting movement with respect to each other about a pivot pin extending transversely to said locking pin, which parts are capable of releasable interlocking pin, which parts are capable of releasable interlocking engagement and which are provided on a side remote from said pivot pin with interlocking closing elements, whereby said parts are capable of pivoting movement with respect to each other from a first position, in which the belt portion extending between said belt tongue and said first end can be positioned between said two parts, to a second position, in which said belt portion is retained between said parts and the belt portion present in said clamping device is undetachably connected to the clamping device, and vice versa, whereby opposite ends of said locking pin are slidably journalled in slots provided in the first part and extending at an angle to the belt, whereby ends of said slots facing the longitudinal side of said back portion are positioned further away from said second part than ends of said slots facing the center of said back portion.

2. A child's seat according to claim 1, characterized in that the clamping device is capable of movement from a first longitudinal side of the back portion, which extends transversely to the seat portion, to a second longitudinal side of the back portion, whereby the clamping device is capable of pivoting movement with respect to the child's seat, in such a manner that the tightening direction is directed away from the child's seat on both longitudinal sides.

3. A child's seat comprising a seat portion and a back portion, which child's seat can be secured in a vehicle by means of a three-point seat belt present in said vehicle, which three-point seat belt is connected to the vehicle with a first end and with a second end and which can be detachable secured to a belt buckle provided in said vehicle by means of a belt tongue provided between said ends, whereby in the mounted position of the child's seat in the vehicle the first end of the belt is positioned near an upper side of said back portion, the second end is positioned under the first end, near the seat portion, and the belt tongue connected to the belt buckle is positioned on a side of said seat portion remote from said second end, whereby the child's seat near the upper side of the back portion is provided with at least one clamping device comprising a housing and a tightening device positioned within said housing, by means of which a bell portion extending between said belt tongue and said first end can be pulled in a tightening direction away from said back portion and be locked against movement with respect to the clamping device in a locking direction opposed to said tightening direction, characterized in that the housing comprises a first and a second part which are capable of pivoting movement with respect to each other about a pivot pin extending transversely to said locking pin, which parts are capable of releasable interlocking engagement and which are provided on a side remote from said pivot pin with interlocking closing elements, whereby said parts are capable of pivoting movement with respect to each other from a first position, in which the belt portion extending between said belt tongue and said first end can be positioned between said two parts, to a second position, in which said belt portion is retained between said parts and the belt portion present in said clamping device is undetachably connected to the clamping device, and vice versa, whereby the first part comprises a C-shaped part oriented transversely to the belt, which is provided with two flanges extending toward each other, whereby the belt can be positioned in said C-shaped part through said flanges, whilst the second part is pivoted in a direction parallel to said C-shaped part, capable of being locked to said first part on either side of the belt with a side remote from said pivot pin, whereby said belt surrounds said C-shaped part and said second part in the shape of an "S" during use.

4. A child's seat according to claim 2, characterized in that the clamping device is capable of movement from a first longitudinal side of the back portion, which extends transversely to the seat portion, to a second longitudinal side of the back portion, whereby the clamping device is capable of pivoting movement with respect to the child's seat, in such a manner that the tightening direction is directed away from the child's seat on both longitudinal sides.

* * * * *